United States Patent
Otagiri et al.

(10) Patent No.: US 9,941,066 B2
(45) Date of Patent: Apr. 10, 2018

(54) OPERATING DEVICE AND IMAGE FORMING APPARATUS

(71) Applicant: FUJI XEROX CO., LTD., Tokyo (JP)

(72) Inventors: Kei Otagiri, Kanagawa (JP); Yuki Ono, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 61 days.

(21) Appl. No.: 15/059,393

(22) Filed: Mar. 3, 2016

(65) Prior Publication Data
US 2017/0018379 A1 Jan. 19, 2017

(30) Foreign Application Priority Data
Jul. 14, 2015 (JP) ................. 2015-140167

(51) Int. Cl.
*H01H 13/02* (2006.01)
*H04N 1/00* (2006.01)
*H01H 9/18* (2006.01)

(52) U.S. Cl.
CPC ...... *H01H 13/023* (2013.01); *H04N 1/00384* (2013.01); *H04N 1/00411* (2013.01); *H01H 9/182* (2013.01)

(58) Field of Classification Search
CPC ............... H01H 13/023; H01H 9/182; H01H 2013/026; H04N 1/00384; H04N 1/00411
USPC ........................................ 362/23.04
See application file for complete search history.

(56) References Cited

U.S. PATENT DOCUMENTS

| 5,083,240 A * | 1/1992 | Pasco | G02B 6/003 362/23.03 |
| 2006/0203485 A1* | 9/2006 | Fu | H01H 13/83 362/237 |
| 2011/0242612 A1* | 10/2011 | Tsubakimoto | H04N 1/00204 358/442 |

FOREIGN PATENT DOCUMENTS

JP 07-288062 A 10/1995

* cited by examiner

*Primary Examiner* — Toan Ly
(74) *Attorney, Agent, or Firm* — Sughrue Mion, PLLC (57) ABSTRACT

An operating device includes a first light source that emits light; a second light source that emits light; a light transmission member that includes a light transmission portion through which the light emitted from the first light source and the light emitted from the second light source are transmitted; and an accepting unit which has a substantially quadrilateral shape, which has four corners, which is disposed between the first light source and the second light source, which is provided such that an extension line of a diagonal that connects two of the four corners to each other passes through the first light source and the second light source, and which accepts an operation to be performed on an image forming apparatus that forms an image on a recording medium.

14 Claims, 7 Drawing Sheets

OPERATING DEVICE AND IMAGE FORMING APPARATUS

CROSS-REFERENCE TO RELATED APPLICATIONS

This application is based on and claims priority under 35 USC 119 from Japanese Patent Application No. 2015-140167 filed Jul. 14, 2015.

BACKGROUND

Technical Field

The present invention relates to an operating device and an image forming apparatus.

SUMMARY

According to an aspect of the invention, there is provided an operating device including a first light source that emits light; a second light source that emits light; a light transmission member that includes a light transmission portion through which the light emitted from the first light source and the light emitted from the second light source are transmitted; and an accepting unit which has a substantially quadrilateral shape, which has four corners, which is disposed between the first light source and the second light source, which is provided such that an extension line of a diagonal that connects two of the four corners to each other passes through the first light source and the second light source, and which accepts an operation to be performed on an image forming apparatus that forms an image on a recording medium.

BRIEF DESCRIPTION OF THE DRAWINGS

Exemplary embodiments of the present invention will be described in detail based on the following figures, wherein.

DETAILED DESCRIPTION

Exemplary embodiments according to the present invention are described in detail below with reference to the attached drawings.

Figure 1:
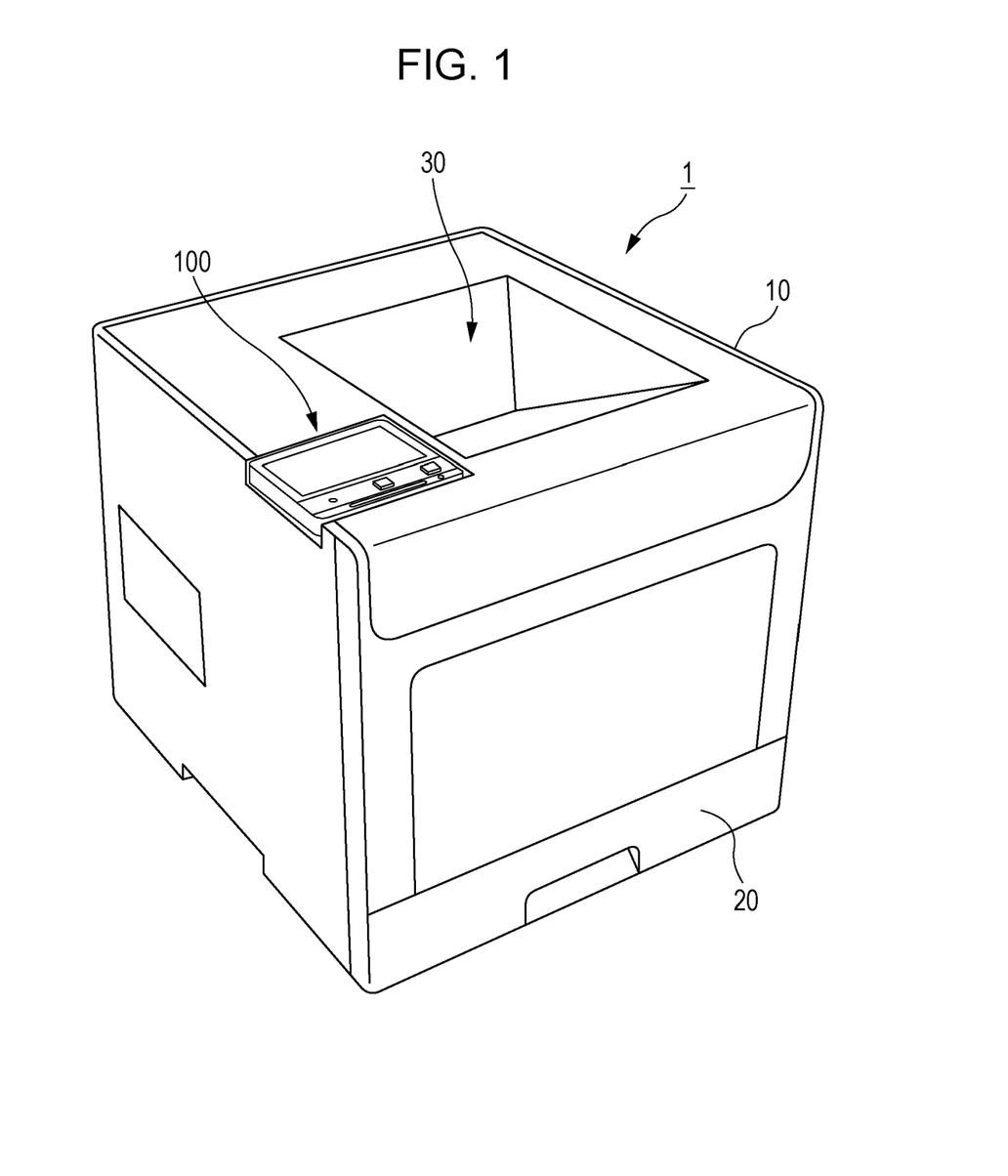
FIG. 1 illustrates an image forming apparatus.

FIG. 1 illustrates an image forming apparatus 1 according to an exemplary embodiment.

The image forming apparatus 1 according to the exemplary embodiment includes an apparatus body 10 and a sheet accommodating unit 20 that accommodates sheets, which are recording media. Although not shown, the inside of the apparatus body 10 includes an image forming mechanism, which is an example of an image forming unit that forms images on the sheets.

The image forming mechanism includes a photoconductor drum, and forms the images on the sheets by using a so-called electrophotographic system. An image forming system is not limited to the electrophotographic system. The image forming system may be other systems, such as an inkjet system.

A sheet discharge section 30 to which the sheets on which the images have been formed are discharged is provided at a top portion of the apparatus body 10. A user interface unit 100 (hereunder referred to as "UI unit 100"), which functions as an operating device that is operated by a user, is provided at the top portion of the apparatus body 10. The UI unit 100 displays information, and accepts an operation from the user.

Figure 2:
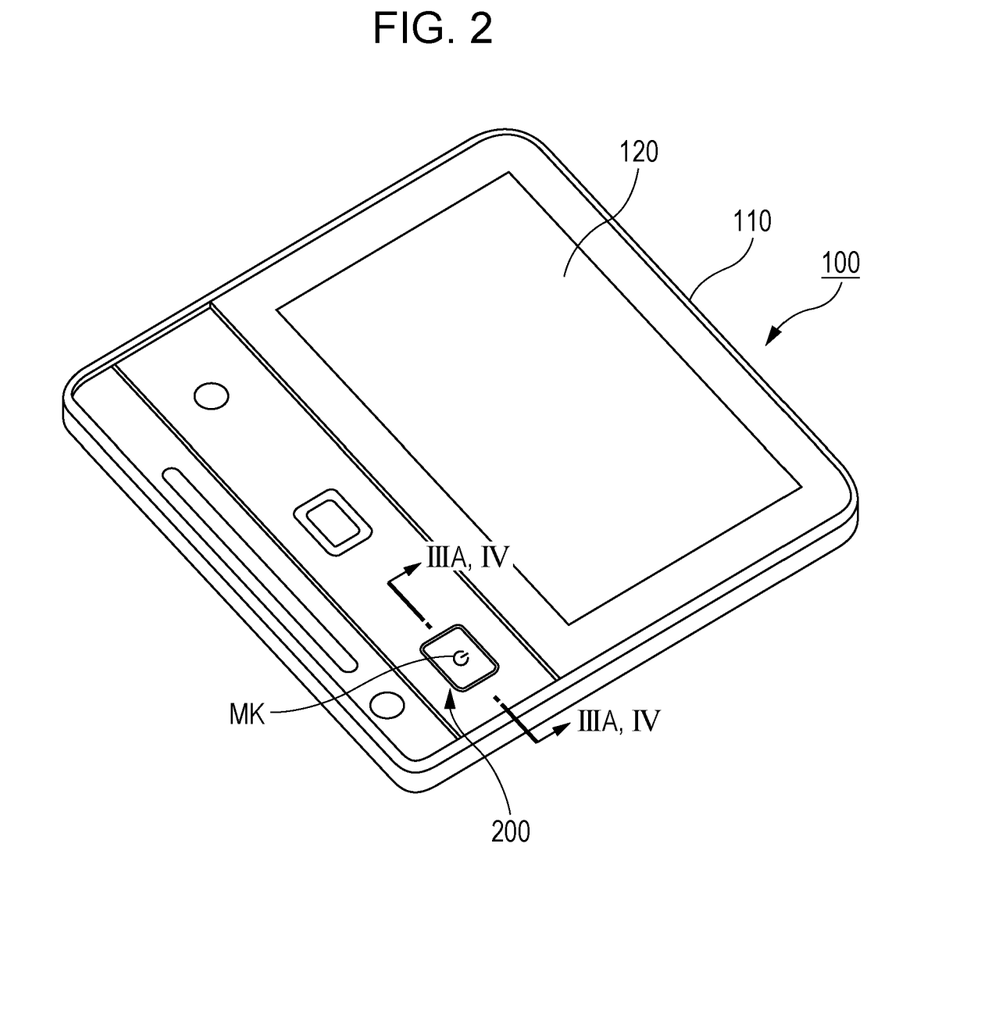
FIG. 2 illustrates a UI unit.

FIG. 2 illustrates the UI unit 100.

The UI unit 100, which functions as the operating device, is provided with a box-shaped housing 110.

The UI unit 100 is also provided with a display panel 120 that is supported by the housing 110. The UI unit 100 is further provided with a power supply button 200.

The display panel 120 is a touch panel. The UI unit 100 displays information by using the display panel 120. The UI unit 100 accepts the operation of the user through the display panel 120.

Figure 3A:
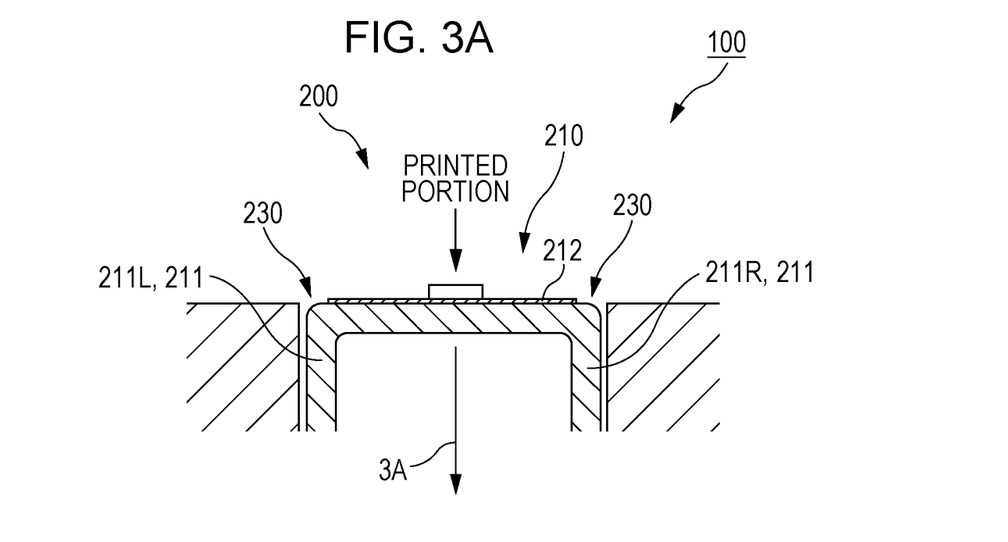
FIGS. 3A and 3B each illustrate a power supply button of the UI unit.
Figure 3B:
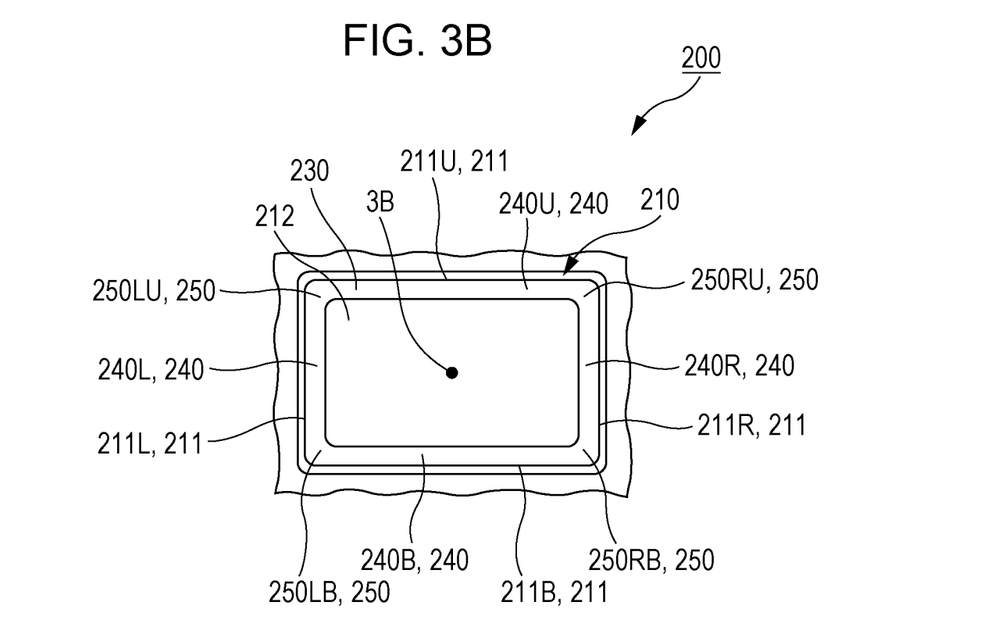

FIGS. 3A and 3B each illustrate the power supply button 200 of the UI unit 100.

FIG. 3A is a sectional view of the power supply button 200 taken along line IIIA-IIIA in FIG. 2. FIG. 3B is a front view of the power supply button 200.

As shown in FIG. 3A, a light transmission member 210 through which light from light sources (described later) is transmitted is provided at the power supply button 200. The light transmission member 210 is black, and is made of a transparent resinous material.

The light transmission member 210 has the shape of a quadrangular prism. As shown in FIG. 3B, the light transmission member 210 includes four side walls 211, that is, a left side wall 211L, a right side wall 211R, an upper side wall 211U, and a lower side wall 211B. FIG. 3A only illustrates the left side wall 211L and the right side wall 211R.

The light transmission member 210 also has the shape of a rectangular cylinder, with one end portion having an opening. In the exemplary embodiment, as shown in FIG. 3A, a closing portion 212 that closes the opening is provided.

The closing portion 212 is positioned on a front surface of the UI unit 100 (see FIG. 2). When a user presses the power supply button 200, the closing portion 212 is pressed by the user. More specifically, as indicated by arrow 3A in FIG. 3A, the closing portion 212 is pressed in the direction of an internal portion of the UI unit 100.

As shown in FIG. 3A, a black rectangular portion is printed on a front surface of the closing portion 212 and at a central portion of the closing portion 212 in a radial direction. The central portion of the closing portion 212 does not pass light therethrough. As shown in FIG. 2, a mark MK that indicates the power supply button is also printed on this black rectangular portion that is printed. In FIG. 3B, the mark MK is not shown.

As shown in FIGS. 3A and 3B, a light transmission portion 230 through which light from the light sources (described later) is transmitted is provided at an outer peripheral edge of the closing portion 212.

The light transmission portion 230 is substantially ring-shaped around a predetermined location as a center (this predetermined location is denoted by symbol 3B in FIG. 3B, and is hereunder referred to as "disposition center 3B").

More specifically, the light transmission portion 230 is substantially ring-shaped and rectangular around the disposition center 3B as the center.

Since the light transmission portion 230 is substantially rectangular, as shown in FIG. 3B, the light transmission portion 230 includes four side portions 240, that is a left side portion 240L, a right side portion 240R, an upper side portion 240U, and a lower side portion 240B. The light transmission portion 230 also includes four corners 250, that is, an upper left corner 250LU, an upper right corner 250RU, a lower left corner 250LB, and a lower right corner 250RB.

Here, the upper side portion 240U and the lower side portion 240B are formed parallel to each other and so as to extend in one direction. More specifically, the upper side portion 240U and the lower side portion 240B are formed so as to extend in the width direction of the UI unit 100 (see FIG. 2).

The left side portion 240L and the right side portion 240R are formed parallel to each other. The left side portion 240L and the right side portion 240R are formed so as to extend in a direction that is orthogonal to the one direction. Additionally, the left side portion 240L and the right side portion 240R are formed so as to extend in the height direction of the UI unit 100.

Figure 4:
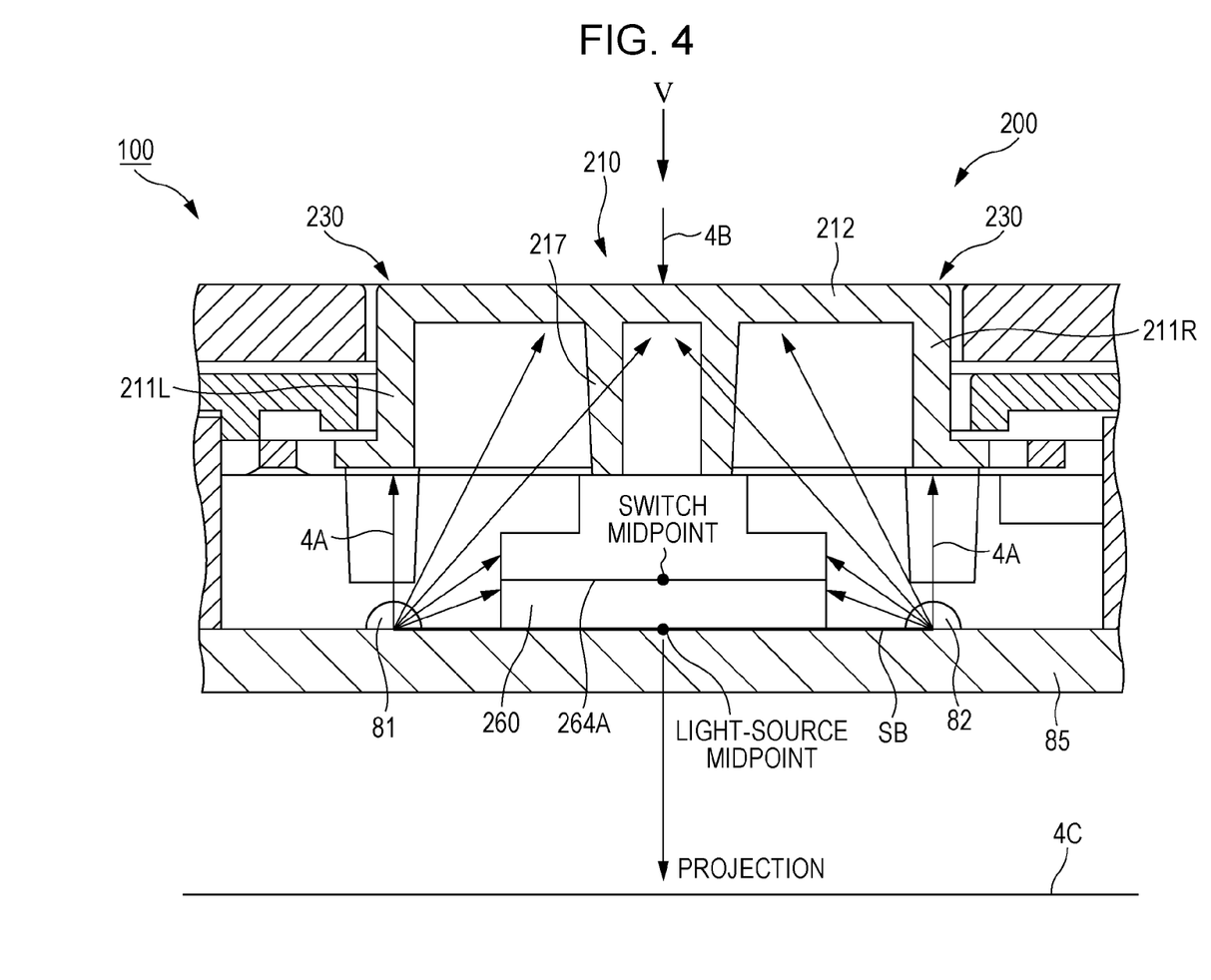
FIG. 4 is a sectional view of the power supply button taken along line IV-IV in FIG. 2.

FIG. 4 is a sectional view of the power supply button 200 taken along line IV-IV in FIG. 2. FIG. 4 illustrates the structure of the power supply button 200 in more detail than FIGS. 3A and 3B.

As shown in FIG. 4, a tactile switch (power supply switch) 260 is provided below the light transmission member 210. The tactile switch 260 functions as an accepting unit, and accepts an on/off operation of a power supply that is performed by a user.

More specifically, in the exemplary embodiment, the user performs the on/off operation of the power supply by pressing the light transmission member 210. The tactile switch 260 accepts the on/off operation via the light transmission member 210.

Although not described above, as shown in FIG. 4, an inner surface of the closing portion 212 of the light transmission member 210 is provided with a projection 217 that protrudes towards the tactile switch 260. The tactile switch 260 is pressed by the projection 217.

In the exemplary embodiment, as shown in FIG. 4, two light sources, that is, a first light source 81 that emits light and a second light source 82 that emits light are provided on respective sides of the tactile switch 260. The first light source 81 and the second light source 82 each include a light emitting diode (LED).

In the exemplary embodiment, the tactile switch 260 is provided between the first light source 81 and the second light source 82. A board 85 that supports the tactile switch 260, the first light source 81, and the second light source 82 is provided below the tactile switch 260, the first light source 81, and the second light source 82.

When the light is emitted from the first light source 81 and the light is emitted from the second light source 82, the emitted lights travel through the cylindrical light transmission member 210 and towards the substantially ring-shaped, rectangular light transmission portion 230.

In the exemplary embodiment, the first light source 81 is provided below the left side wall 211L (on an extension line of the left side wall 211L), and the second light source 82 is provided below the right side wall 211R (on an extension line of the right side wall 211R).

Therefore, as shown by arrow 4A, a portion of the light emitted from the first light source 81 travels towards the left side wall 211L and towards the light transmission portion 230 via the inside of the left side wall 211L; and, as shown by another arrow 4A, a portion of the light emitted from the second light source 82 travels towards the right side wall 211R and towards the light transmission portion 230 via the inside of the right side wall 211R.

The light that has reached the light transmission portion 230 leaks to the outside of the UI unit 100 through the light transmission portion 230. This causes an outer peripheral edge of the power supply button 200 to be bright, so that the user is capable of more easily perceiving the location where the power supply button 200.

Figure 5:
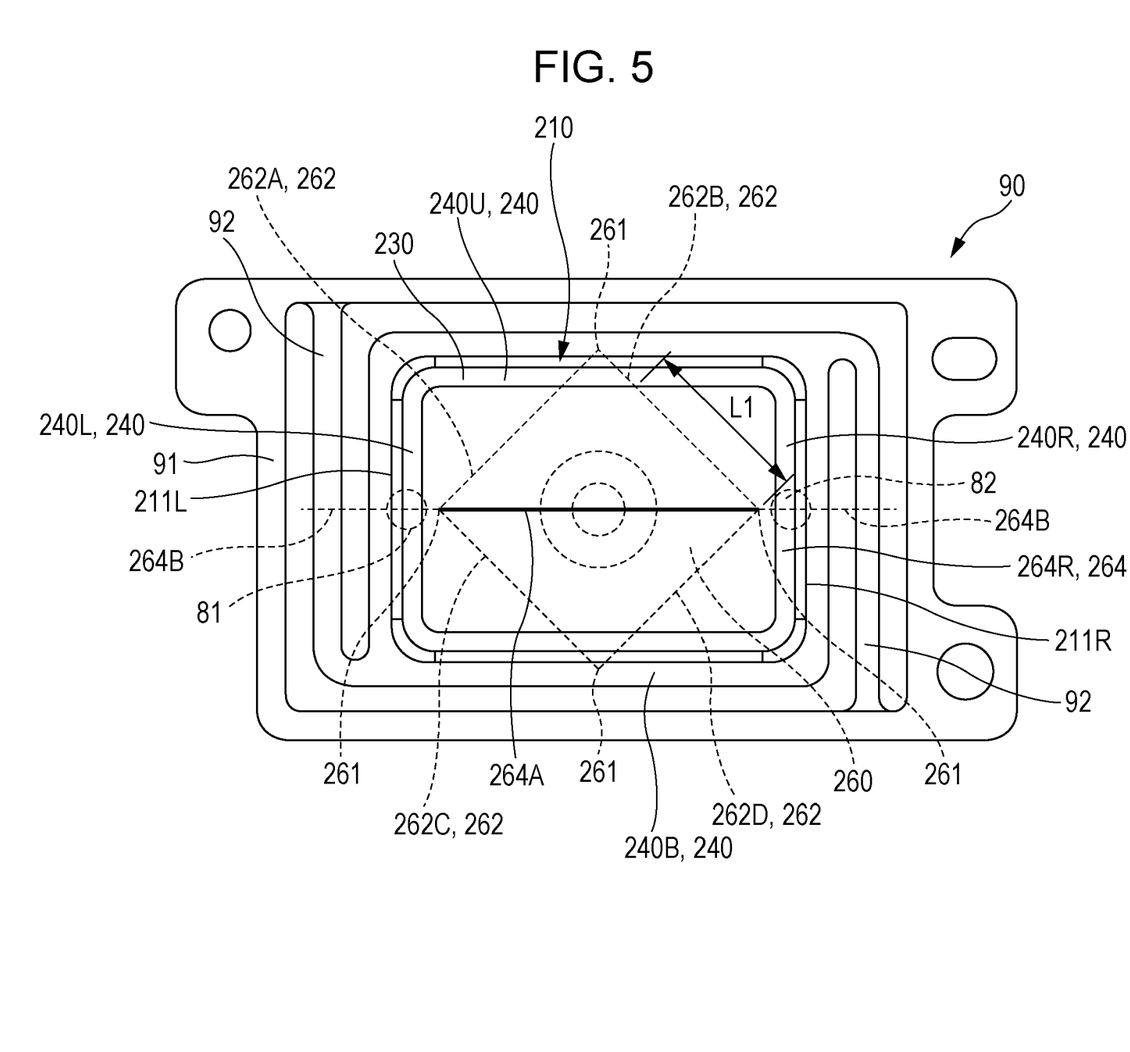
FIG. 5 illustrates a light transmission member, a tactile switch, a first light source, and a second light source when viewed from the direction of arrow V in FIG. 4.

FIG. 5 illustrates the light transmission member 210, the tactile switch 260, the first light source 81, and the second light source 82 when viewed from the direction of arrow V in FIG. 4.

Although not described above, in the exemplary embodiment, a supporting member 90 that supports the light transmission member 210 is provided around the light transmission member 210. The supporting member 90 includes a supporting-member body 91 and two elastic portions 92. The supporting-member body 91 is disposed around the ring-shaped light transmission member 210. The two elastic portions 92 connect the supporting-member body 91 and the light transmission member 210 to each other.

When the user presses the light transmission member 210, the light transmission member 210 moves towards the internal portion of the UI unit 100. At this time, the elastic portions 92 are elastically deformed.

When the user stops pressing the light transmission member 210, the elastic portions 92 are restored to their original states. This causes the light transmission member 210 to be restored to its original state.

Here, in the exemplary embodiment, as described above and as shown in FIG. 5, the first light source 81 is positioned below the left side wall 211L, and the second light source 82 is positioned below the right side wall 211R.

In the exemplary embodiment, the first light source 81 is positioned below the left side portion 240L of the light transmission portion 230, and the second light source 82 is positioned below the right side portion 240R of the light transmission portion 230.

As shown in FIG. 5, when the tactile switch 260 is viewed from the side where the light transmission member 210 is installed, the tactile switch 260 has a substantially quadrilateral shape (square shape), and includes four switch corners 261. The tactile switch 260 also includes four side walls 262, that is, an upper left side wall 262A, an upper right side wall 262B, a lower left side wall 262C, and a lower right side wall 262D.

Further, in the exemplary embodiment, the tactile switch 260 is disposed between the first light source 81 and the second light source 82. The tactile switch 260 is provided such that an extension line 264B of a diagonal 264A that connects two switch corners 261 at diagonal positions passes through the first light source 81 and the second light source 82.

In the exemplary embodiment, as shown in FIG. 4, the tactile switch 260 is provided such that a midpoint (hereunder referred to as "switch midpoint") of the diagonal 264A is aligned with a midpoint (hereunder referred to as "light-source midpoint") of a line segment SB that connects the first light source 81 and the second light source 82 to each other.

More specifically, in the exemplary embodiment, when the light-source midpoint and the switch midpoint are projected in the direction in which the user presses the light transmission member 210 (see arrow 4B in FIG. 4) and towards a projection plane (imaginary plane) 4C that is orthogonal to the pressing direction, the light-source midpoint and the switch midpoint are aligned with each other.

Further, in the exemplary embodiment, as shown in FIG. 3B, the light transmission portion 230 is substantially ring-shaped around the disposition position 3B as center. In the exemplary embodiment, the disposition center 3B of the light transmission portion 230 is aligned with the midpoint (light-source midpoint) (see FIG. 4) of the line segment SB that connects the first light source 81 and the second light source 82 to each other.

More specifically, when the light-source midpoint and the disposition center 3B are projected in the direction in which the user presses the light transmission member 210 (in the direction of arrow 4B in FIG. 4) and towards the projection plane 4C, the light-source midpoint and the disposition center 3B are aligned with each other.

Further, in the exemplary embodiment, the light transmission portion 230 and the tactile switch 260 are provided such that the upper side portion 240U (see FIG. 3B) of the light transmission portion 230 and the lower side portion 240B of the light transmission portion 230 are positioned along the diagonal 264A (see FIG. 5) of the tactile switch 260.

Additionally, in the exemplary embodiment, the light transmission portion 230 and the tactile switch 260 are provided such that, of the four side portions 240 of the light transmission portion 230, the upper side portion 240U and the lower side portion 240B that are disposed parallel to each other and that extend in the same direction are positioned along the diagonal 264A of the tactile switch 260.

Figure 6A:
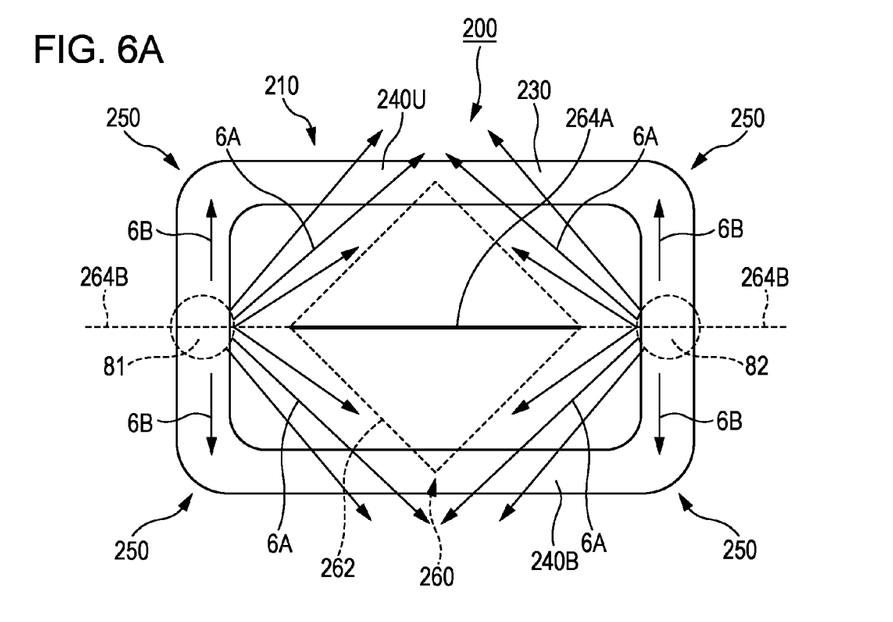
FIGS. 6A and 6B each illustrate the relationship between light emitted from the first light source and the tactile switch, and the relationship between light emitted from the second light source and the tactile switch.
Figure 6B:
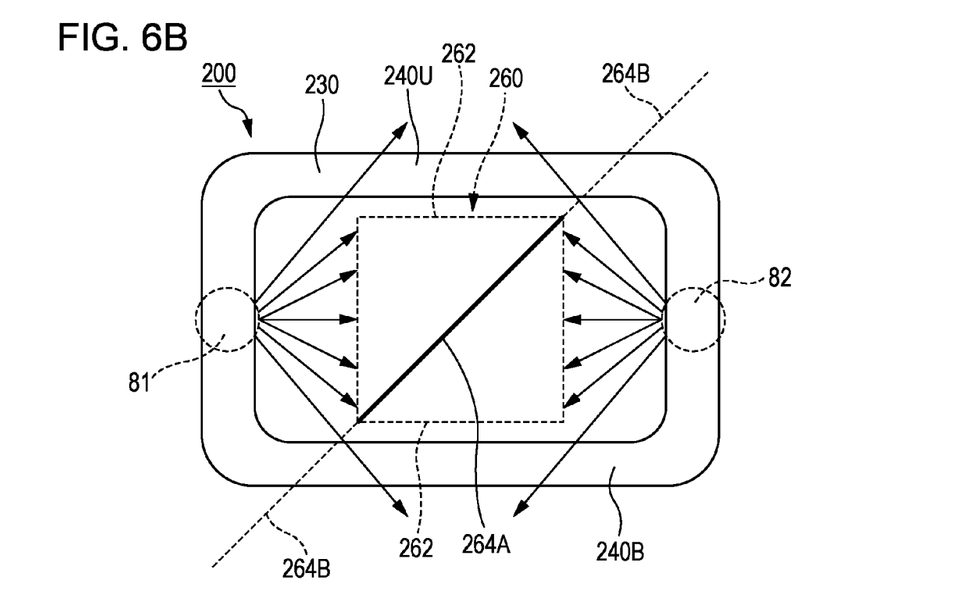

FIGS. 6A and 6B illustrate the relationship between the light emitted from the first light source 81 and the tactile switch 260, and the relationship between the light emitted from the second light source 82 and the tactile switch 260.

In the structure according to the exemplary embodiment, as described above and as shown in FIG. 6A, the extension line 264B of the diagonal 264A of the tactile switch 260 passes through the first light source 81 and the second light source 82.

Therefore, as indicated by symbols 6A in FIG. 6A, the light emitted from the first light source 81 and the light emitted from the second light source 82 travel along the sides of the tactile switch 260 and towards a central portion of the upper side portion 240U in the longitudinal direction and a central portion of the lower side portion 240B in the longitudinal direction.

As indicated by symbols 6B in FIG. 6A, the light emitted from the first light source 81 and the light emitted from the second light source 82 also each travel towards corresponding two corners 250 of the four corners 250 of the light transmission portion 230.

FIG. 6B illustrates a comparative example of the power supply button 200.

In the comparative example, the first light source 81 and the second light source 82 are not positioned on the extension line 264B of the diagonal 264A of the tactile switch 260, that is, the diagonal 264A and the line segment that connects the first light source 81 and the second light source 82 to each other (not shown in FIG. 6B) intersect each other.

Additionally, in the comparative example, the tactile switch 260 is provided such that two side walls 262 of the tactile switch 260 are provided along the line segment that connects the first light source 81 and the second light source 82 to each other.

In the comparative example, a portion of light emitted from the first light source 81 and a portion of light emitted from the second light source 82 are blocked by the tactile switch 260, as a result of which the light emitted from the first light source 81 and the light emitted from the second light source 82 are less likely to reach the central portion of the upper side portion 240U and the central portion of the lower side portion 240B. In such a case, the central portions become dark, as a result of which the light quantity at the light transmission portion 230 tends to become uneven.

In contrast, in the exemplary embodiment, the amount by which the light emitted from the first light source 81 is blocked by the tactile switch 260 and the amount by which the light emitted from the second light source 82 is blocked by the tactile switch 260 are reduced, so that, compared to the comparative example, the unevenness in the light quantity at the light transmission portion 230 is reduced.

Figure 7:
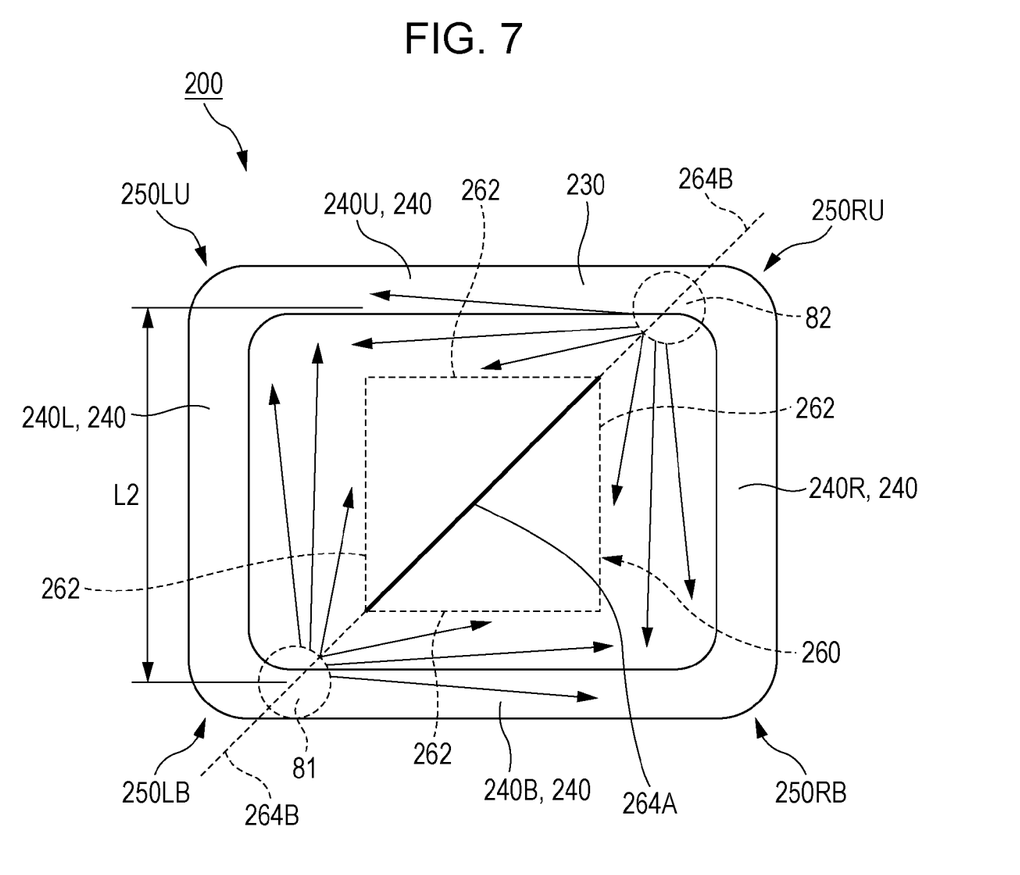
FIG. 7 illustrates a structure according to another exemplary embodiment.

FIG. 7 illustrates a structure according to another exemplary embodiment.

In this structure, as with the structure already described above, an extension line 264B of a diagonal 264A passes through a first light source 81 and a second light source 82.

However, in this structure, the first light source 81 is disposed below a lower left corner 250LB of a light transmission portion 230, and the second light source 82 is disposed below an upper right corner 250RU of the light transmission portion 230.

Further, a tactile switch 260 is provided such that side walls 262 of the tactile switch 260 are provided along side portions 240 of the light transmission portion 230.

Additionally, although, in the exemplary embodiment shown in FIG. 5, of the four side portions 240 of the light transmission portion 230, two side portions 240 (upper side portion 240U and lower side portion 240B) are provided along the diagonal 264A, each side portion 240 of the light transmission portion 230 according to the exemplary embodiment shown in FIG. 7 intersects the diagonal 264A.

Here, in this structure according to the exemplary embodiment shown in FIG. 7, as in the above-described structure, light emitted from the first light source 81 and light emitted from the second light source 82 travel along the sides of the tactile switch 260, so that the amount by which the light emitted from the first light source 81 is blocked by the tactile switch 260 and the amount by which the light emitted from the second light source 82 is blocked by the tactile switch 260 are reduced.

On the other hand, in the exemplary embodiment shown in FIG. 7, a separation distance between the first light source 81 and the light transmission portion 230 and a separation distance between the second light source 82 and the light transmission portion 230 are greater than those in the above-described exemplary embodiment shown in FIG. 5.

More specifically, of the separation distances between the first light source 81 and the light transmission portion 230 and the separation distances between the second light source 82 and the light transmission portion 230, greatest separation distances (that is, maximum separation distances) in the exemplary embodiment shown in FIG. 7 differ from those in the above-described exemplary embodiment shown in FIG. 5. That is, the maximum separation distances in the exemplary embodiment shown in FIG. 7 are greater than the maximum separation distances in the exemplary embodiment shown in FIG. 5.

Here, in the exemplary embodiment shown in FIG. 5, each maximum separation distance corresponds to a distance L1. More specifically, the maximum separation distances correspond to the separation distance between the first light source 81 and a central portion of the upper side portion 240U in the longitudinal direction thereof, the separation distance between the second light source 82 and the central portion of the upper side portion 240U in the longitudinal direction thereof, the separation distance between the first light source 81 and a central portion of the lower side portion 240B in the longitudinal direction thereof, and the distance between the second light source 82 and the central portion of the lower side portion 240B in the longitudinal direction thereof.

In contrast, in the exemplary embodiment shown in FIG. 7, each maximum separation distance corresponds to a distance L2. More specifically, the maximum separation distances correspond to the separation distance between the first light source 81 and an upper left corner 250LU, the separation distance between the second light source 82 and the upper left corner 250LU, the separation distance between the first light source 81 and a lower right corner 250RB, and the separation distance between the second light source 82 and the lower right corner 250RB.

Here, the maximum separation distances in the exemplary embodiment shown in FIG. 7 are greater than the maximum separation distances in the exemplary embodiment shown in FIG. 5. More specifically, in the exemplary embodiment shown in FIG. 5, each maximum separation distance corresponds to the distance L1, whereas, in the exemplary embodiment shown in FIG. 7, each maximum separation distance corresponds to the distance L2 that is greater than the distance L1.

As a result, in the exemplary embodiment shown in FIG. 7, the light quantity at the upper left corner 250LU and the light quantity at the lower right corner 250RB are less than those in the exemplary embodiment shown in FIG. 5.

In contrast, although, in the exemplary embodiment shown in FIG. 5, the quantity of light at the central portion of the upper side portion 240U and the quantity of light at the central portion of the lower side portion 240B tend to be reduced, the amounts of reduction in such quantities of light are less than those in the exemplary embodiment shown in FIG. 7.

Next, the relationship between the disposition position 3B (shown in FIG. 3B) of the light transmission portion 230 and the light-source midpoint is described.

In the exemplary embodiment, the disposition center 3B of the light transmission portion 230 and the midpoint (light-source midpoint) (see FIG. 4) of the line segment SB that connects the first light source 81 and the second light source 82 to each other are aligned with each other. This also makes it less likely for unevenness in light quantity to occur.

Here, for example, if the disposition center 3B of the light transmission portion 230 and the light-source midpoint are not aligned with each other, that is, when the disposition center 3B of the light transmission portion 230 is disposed closer to either one of the first light source 81 and the second light source 82, unevenness in light quantity at the light transmission portion 230 occurs more often than when the disposition center 3B of the light transmission portion 230 is not disposed closer to either one of the first light source 81 and the second light source 82.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operating device comprising:
a first light source that emits light;
a second light source that emits light;
a light transmission member that includes a light transmission portion through which the light emitted from the first light source and the light emitted from the second light source are transmitted; and
an accepting unit that has a substantially quadrilateral shape and that has four corners, the accepting unit being disposed between the first light source and the second light source, the accepting unit being provided such that an extension line of a diagonal that connects two of the four corners to each other passes through the first light source and the second light source, the accepting unit accepting an operation to be performed on an image forming apparatus that forms an image on a recording medium.

2. The operating device according to claim 1, wherein the accepting unit is provided such that a midpoint of the diagonal is aligned with a midpoint of a line segment that connects the first light source and the second light source to each other.

3. The operating device according to claim 1, wherein the light transmission portion is substantially ring-shaped.

4. The operating device according to claim 3, wherein the light transmission portion is substantially ring-shaped around a predetermined location as a center, and
wherein the light transmission portion is provided such that the center of the light transmission portion is aligned with a midpoint of a line segment that connects the first light source and the second light source to each other.

5. The operating device according to claim 1, wherein the light transmission portion is substantially ring-shaped and rectangular, the light transmission portion including four side portions, the light transmission portion being provided such that, of the four side portions, two side portions that extend in one direction are provided along the diagonal.

6. The operating device according to claim 5, wherein the light transmission portion is substantially ring-shaped and rectangular around a predetermined location as a center, and
wherein the light transmission portion is provided such that the center of the light transmission portion is aligned with a midpoint of a line segment that connects the first light source and the second light source to each other.

7. The operating device according to claim 1, wherein the light emitting element is disposed directly below an outermost part of the light transmission member in a direction that is the same as the direction of movement of the accepting unit when operated.

8. The operating device according to claim 1, further comprising one closing portion to close an opening of the light transmission member, wherein the closing portion is configured to close both the light emitted from the first light source and the light emitted from the second light source.

9. The operating device according to claim 8, wherein the light transmission member has a shape of cylinder and the opening is provided at the one end of the cylinder.

10. The operating device according to claim 8, wherein a center of the closing portion does not pass light therethrough.

11. The operating device according to claim 8, further comprising a light transmission portion through which light from the light sources is transmitted and which is provided at an outer peripheral edge of the closing portion.

12. The operating device according to claim 8, the accepting unit is provided at inner surface of the closing portion.

13. An image forming apparatus comprising:
- an image forming unit that forms an image on a recording medium;
- a first light source that emits light;
- a second light source that emits light;
- a light transmission member that includes a light transmission portion through which the light emitted from the first light source and the light emitted from the second light source are transmitted; and
- an accepting unit that has a substantially quadrilateral shape and that has four corners, the accepting unit being disposed between the first light source and the second light source, the accepting unit being provided such that an extension line of a diagonal that connects two of the four corners to each other passes through the first light source and the second light source, the accepting unit accepting an operation of a user.

14. An operating device comprising:
- a first light means for emitting light;
- a second light means for emitting light;
- a light transmission means for transmitting the light emitted from the first light source and the light emitted from the second light source are transmitted; and
- an accepting means for accepting an operation, the accepting means having a substantially quadrilateral shape and that has four corners, the accepting means being disposed between the first light source and the second light source, the accepting means being provided such that an extension line of a diagonal that connects two of the four corners to each other passes through the first light source and the second light source, the accepting means for accepting the operation to be performed on an image forming apparatus that forms an image on a recording medium.

* * * * *